(12) United States Patent
Strey et al.

(10) Patent No.: US 12,123,700 B2
(45) Date of Patent: Oct. 22, 2024

(54) METHODS AND SYSTEMS FOR BLOWN FILM THICKNESS MEASUREMENT

(71) Applicant: 3M INNOVATIVE PROPERTIES COMPANY, St. Paul, MN (US)

(72) Inventors: Thomas J. Strey, River Falls, WI (US); David L. Hofeldt, Oakdale, MN (US); Gregory J. McGill, Maplewood, MN (US); Jay M. Krieger, Eau Claire, WI (US); Christopher J. Rother, St. Paul, MN (US); Paul C. Thomas, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 346 days.

(21) Appl. No.: 17/765,873

(22) PCT Filed: Sep. 24, 2020

(86) PCT No.: PCT/IB2020/058929
§ 371 (c)(1),
(2) Date: Apr. 1, 2022

(87) PCT Pub. No.: WO2021/069997
PCT Pub. Date: Apr. 15, 2021

(65) Prior Publication Data
US 2022/0412723 A1 Dec. 29, 2022

Related U.S. Application Data

(60) Provisional application No. 62/913,496, filed on Oct. 10, 2019.

(51) Int. Cl.
*G01B 11/06* (2006.01)
*B29C 48/10* (2019.01)
(Continued)

(52) U.S. Cl.
CPC ............ *G01B 11/06* (2013.01); *B29C 48/10* (2019.02); *B29C 48/92* (2019.02); *B29C 48/885* (2019.02);
(Continued)

(58) Field of Classification Search
None
See application file for complete search history.

(56) References Cited

U.S. PATENT DOCUMENTS

| 3,474,160 | A | 10/1969 | Doering |
| 4,351,785 | A | 9/1982 | Upmeier et al. |

(Continued)

FOREIGN PATENT DOCUMENTS

| DE | 4406664 | 9/1994 |
| DE | 10248366 | 6/2005 |

(Continued)

OTHER PUBLICATIONS

Translation for EP 3480553 A1 (Year: 2019).*
International Search Report for PCT Application No. PCT/IB2020/058929 mailed on Jan. 19, 2021, 5 pages.

*Primary Examiner* — Thomas R Artman
(74) *Attorney, Agent, or Firm* — Yufeng Dong; Sriram Srinivasan (57) ABSTRACT

Methods and systems of measurement for blown film lines are provided. The sensing system includes a terahertz (THz) sensor positioned adjacent to a film bubble extruded from a blown film die, and a sensor support configured to guide the THz sensor around the circumference of the film bubble to measure its film thickness.

13 Claims, 8 Drawing Sheets

(51) Int. Cl.
  *B29C 48/92* (2019.01)
  *B29C 48/88* (2019.01)
  *B29C 48/885* (2019.01)

(52) U.S. Cl.
  CPC .. *B29C 48/913* (2019.02); *B29C 2948/92152* (2019.02); *B29C 2948/92428* (2019.02); *B29C 2948/92647* (2019.02)

(56) References Cited

U.S. PATENT DOCUMENTS

| | | |
|---|---|---|
| 4,711,747 A | 12/1987 | Halter |
| 5,135,689 A | 8/1992 | Sensen et al. |
| 5,281,375 A | 1/1994 | Konermann |
| 5,468,134 A | 11/1995 | Cree |
| 5,505,601 A | 4/1996 | Sensen et al. |
| 5,676,893 A | 10/1997 | Cree |
| 5,951,926 A | 9/1999 | Sensen et al. |
| 6,605,950 B2 | 8/2003 | Stein |
| 6,702,563 B2 | 3/2004 | Sensen et al. |
| 6,875,002 B2 | 4/2005 | Prudhomme |
| 7,695,263 B2 | 4/2010 | Fischer |
| 7,806,674 B2 | 10/2010 | Joppe et al. |
| 7,806,676 B2 | 10/2010 | Hensley et al. |
| 8,212,574 B2 | 7/2012 | Backmann |
| 8,378,304 B2 | 2/2013 | Mousavi et al. |
| 8,561,313 B2 | 10/2013 | Muller et al. |
| 8,561,455 B2 | 10/2013 | Konermann et al. |
| 8,747,725 B2 | 6/2014 | Avermeyer et al. |
| 9,017,053 B2 | 4/2015 | Rubbelke |
| 9,050,760 B2 | 6/2015 | Bedford |
| 9,360,296 B2 | 6/2016 | White et al. |
| 9,470,504 B2 | 10/2016 | Backmann |
| 2009/0045555 A1 | 2/2009 | Kulgemeyer et al. |
| 2009/0306923 A1 | 12/2009 | Keller et al. |
| 2010/0141274 A1 | 6/2010 | Keller et al. |
| 2010/0314723 A1 | 12/2010 | Schmidt et al. |
| 2011/0161036 A1 | 6/2011 | Keller et al. |
| 2013/0099803 A1 | 4/2013 | Backmann |
| 2018/0194055 A1 | 7/2018 | Nerling |
| 2022/0082371 A1* | 3/2022 | Chen ............... G01B 11/06 |
| 2022/0412723 A1* | 12/2022 | Strey .............. G01B 11/0691 |
| 2023/0095853 A1* | 3/2023 | Thiel ............ G01N 21/3563 356/432 |
| 2023/0219274 A1* | 7/2023 | Merrill ............. B29C 48/32 264/401 |

FOREIGN PATENT DOCUMENTS

| | | | |
|---|---|---|---|
| DE | 102017006818 | 3/2018 | |
| DE | 102016012469 | 4/2018 | |
| EP | 0943413 | 9/1999 | |
| EP | 3480553 A1 * | 5/2019 | ........ G01B 11/028 |
| EP | 3480553 | 9/2021 | |
| WO | WO 2017-051579 | 3/2017 | |
| WO | WO 2018-001852 | 1/2018 | |
| WO | WO 2019-180556 | 9/2019 | |

\* cited by examiner

METHODS AND SYSTEMS FOR BLOWN FILM THICKNESS MEASUREMENT

CROSS REFERENCE TO RELATED APPLICATIONS

This application is a national stage filing under 35 U.S.C. 371 of PCT/IB2020/058929 filed Sep. 24, 2020, which claims the benefit of U.S. Application No. 62/913,496, filed Oct. 10, 2019, the disclosure of which is incorporated by reference in its/their entirety herein.

FIELD OF THE DISCLOSURE

This disclosure relates to methods and systems for film thickness measurement.

BACKGROUND

Sensor systems are widely used to measure the thickness of film-shaped or web-shaped materials. For example, blown-film manufacturing lines have many options for caliper measurements. Film thickness sensor systems are described in, e.g., U.S. Pat. Nos. 8,212,574 and 9,470,504. Blown-film extrusion systems are described in, e.g., U.S. Pat. Nos. 6,702,563, 5,951,926 and 5,505,601.

SUMMARY

Methods and systems of online measurement for blown film lines are provided.

In one aspect, a sensing system is provided for online measurement of a blown film. The sensing system includes a terahertz (THz) sensor positioned adjacent to a film bubble extruded from a blown film die, and a sensor support configured to guide the THz sensor around the circumference of the film bubble. The THz sensor is configured to emit a THz beam toward the film bubble and detect signals reflected from the film bubble.

In another aspect, a method for online measurement of a blown film is provided. The method includes providing a terahertz (THz) sensor positioned adjacent to a film bubble extruded from a blown film die; guiding, via a sensor support, the THz sensor around the circumference of the film bubble; and measuring, via the THz sensor, a film thickness profile of the film bubble.

Various unexpected results and advantages are obtained in exemplary embodiments of the disclosure. One such advantage of exemplary embodiments of the present disclosure is that one or more terahertz (THz) sensors are used to measure a film bubble in a blown film line. The THz sensors can provide accurate thickness measurements with a high spatial resolution at a safe distance away from the film bubble.

BRIEF DESCRIPTION OF THE DRAWINGS

The disclosure may be more completely understood in consideration of the following detailed description of various embodiments of the disclosure in connection with the accompanying figures, in which.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part is well known, may require some explanation. It should be understood that:

The term "blown film line or process" refers to an aggregation of manufacturing equipment that uses one or more extruders, an annular die, and a fan to take the input material provided, melt it, and produce a column of material that is then flattened and wound into rolls.

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Figure 1A:
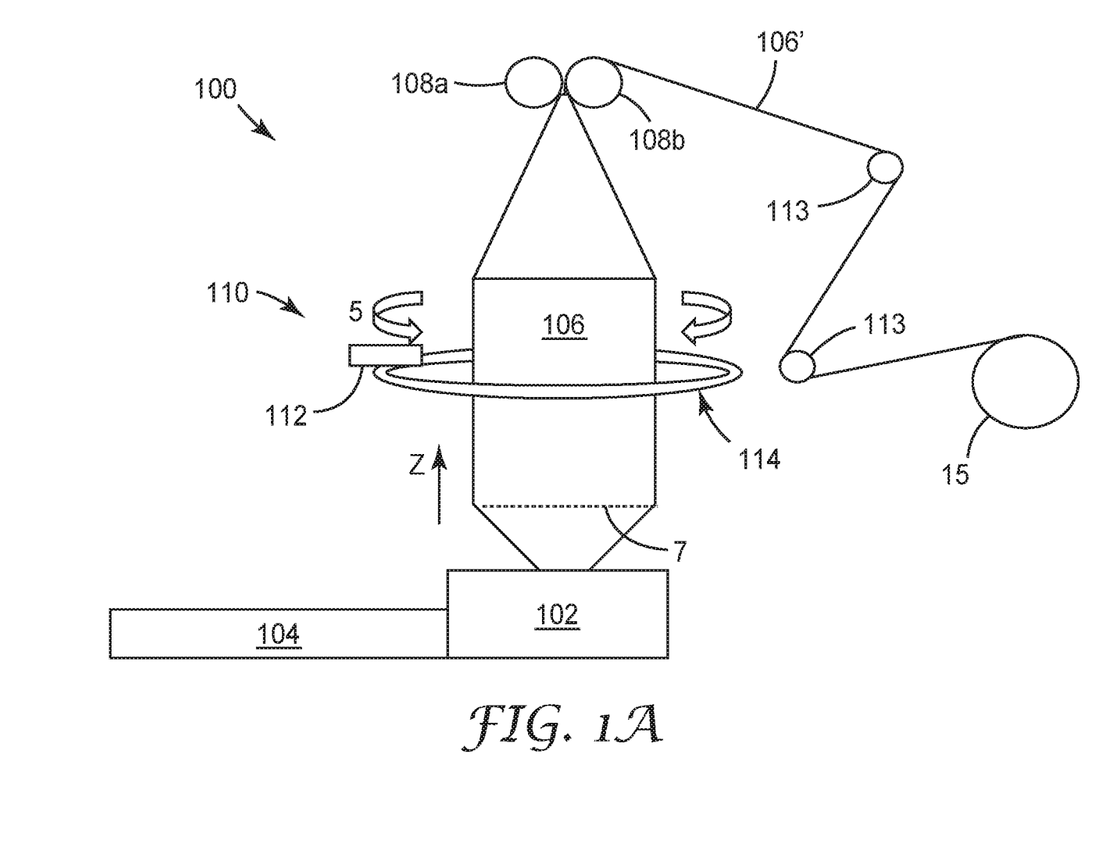
FIG. 1A is a schematic diagram of a blown film manufacturing line, according to one embodiment.
Figure 1B:
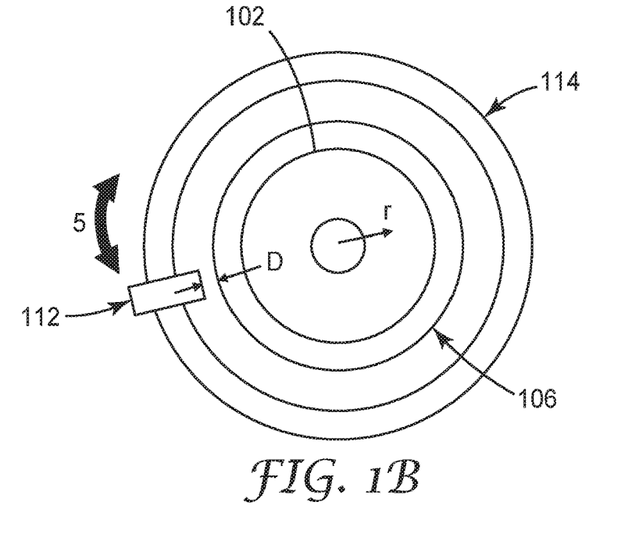
FIG. 1B is a top view the blown film manufacturing line of FIG. 1A.

FIG. 1A is a schematic diagram of a blown-film manufacturing system or line 100, according to one embodiment. FIG. 1B is a top view the system 100 of FIG. 1A. The system 100 includes a blown film die 102 coupled with an extruder 104 to extrude a film bubble or a film tube 106 which moves in the direction of an arrow Z. The film bubble 106 is cooled and then collapsed by a lay-flat section into a doubled film 106'. In the depicted embodiment FIG. 1A, the lay-flat section includes a set of nip rolls 108a and 108b. The doubled film 106' is then transferred, e.g., via idler rolls 113, and wound into a roll by a roll winder 15.

Typical blown film extrusion processes can be carried out vertically upwards, horizontally, or downwardly. Polymer materials can be compacted and melted to form a continuous, viscous liquid. The molten plastic can then be extruded through the die 102. Air can be injected through a hole in the center of the die 102, and the pressure can cause the extruded melt to expand into a bubble. The bubble can be pulled continually from the die and a cooling ring (not shown in FIG. 1A) can be provided to blow air onto the film. The film bubble can also be cooled from the inside using internal bubble cooling. After solidification at a frost line 7, the film can move into the set of nip rollers 108a-b which collapse the bubble film 106 and flatten it into the doubled film 106'.

The system 100 further includes a sensor system 110 including a sensor 112 positioned adjacent to the film bubble 106 with a standoff distance D as shown in FIG. 1B. The sensor 112 can include, for example, a terahertz (THz) sensor configured to emit THz radiation/beam toward the film bubble 106, and detect signals reflected from the film bubble 106. A block diagram of an exemplary THz sensor is shown FIG. 2A, which will be described further below.

In some embodiments, the sensor system 110 may further include a processor to process the signals to determine one or more physical properties (e.g., thickness) of the film bubble 106. In some embodiments, the processor may be integrated with the sensor as a one-piece sensor device. In some embodiments, the processor may be a remote processor. In some embodiments, the processor may be functionally connected to a controller for the system 100.

The sensor system 110 further includes a sensor support 114 to support and guide the sensor 112. In the depicted embodiment of FIGS. 1A-B, the sensor support 114 includes a scanner track around the circumference of the film bubble 106. The sensor support 114 is configured to position the sensor 112 at a safe distance (e.g., a standoff distance D) away from the film bubble 106. In the depicted embodiment of FIGS. 1A-B, the sensor support 114 can continuously move around the film bubble 106 in the circumferential direction 5, while the sensor 112 is measuring the film bubble 106. The sensor support 114 can guide the sensor 112 to move around the circumference of the film bubble 106 in any suitable manner, e.g., an oscillating movement as indicated by the arrow 5, a centripetal movement, an axial movement along the z arrow, a radial movement along the radial direction r, etc.

The standoff distance D between the sensor 112 and the film bubble 106 may vary depending on many factors such as, for example, the focal length of the beam optics selected for the sensor 112, the operating fluctuation of the film bubble 106 along the radial direction r, etc. In general, the sensor 112 can be located at a safe distance away from the film bubble 106 such that an incidental contact therebetween during a blown-film process can be avoided. Exemplary ranges of the standoff distance D can be from about 5 mm to about 500 mm, from about 10 mm to about 300 mm, or from about 10 to about 200 mm. In some embodiments, the standoff distance D may be no less than about 5 mm, no less than about 10 mm, no less than about 15 mm, no less than about 20 mm, no less than about 25 mm, no less than about 30 mm, or no less than about 40 mm. In some embodiments, when a 25 mm focal length lens is used, typical ranges of the standoff distance D may be, for example, from about 10 to about 40 mm. In some embodiments, when a 75 mm focal length lens is used, typical ranges of the standoff distance D may be, for example, from about 60 to about 90 mm. In some embodiments, when a 150 mm focal length lens is used, typical ranges of the standoff distance D may be, for example, from about 135 to about 165 mm.

Typically, the film bubble 106 may have its diameter along the radial direction r fluctuate during a blown film extrusion process. Such an operating fluctuation of the bubble walls of the film bubble 106 along the radial direction r can be in the range, for example, about ±5 mm. This may not significantly impact the measurement by the sensor 112. In some embodiments, suitable bubble tracking procedures can be provided to detect the fluctuations and determine and maintain the desired standoff distance D between the bubble film and the sensor. In some embodiments, the desired standoff distance can be maintained by mounting the sensor onto a linear, motorized stage that can traverse the Terahertz sensor normal to the surface of the material. In some embodiments, a distance measurement sensor can be used to determine the distance between the sensor is from the film bubble and instruct the motorized stage to move based on the resultant distance measurement.

In some embodiments, the sensor 112 can be a THz sensor. The term "terahertz or THz sensor" refers to a system which includes emitting and receiving elements that respond to electromagnetic waves in the frequency range extending nominally from 0.01 THz to 10 THz. There are both continuous wave and pulsed versions of such systems that can be used for studies of material properties such as, for example, composition, density, and/or thickness. In some embodiments described herein, sensing data are obtained with a pulsed time-domain system. It is to be understood that those skilled in the art can recognize that similar information can be obtained from frequency-domain THz systems or other suitable types of THz sensors. Exemplary THz sensors or systems are described in U.S. Pat. Nos. 9,360,296 and 8,378,304, which are incorporated herein by reference.

Figure 2A:
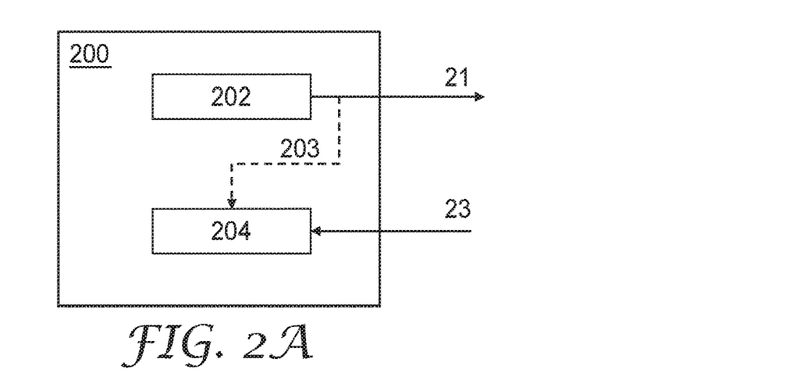
FIG. 2A is a block diagram of a THz sensor, according to one embodiment.

FIG. 2A is a block diagram of an exemplary THz sensor 200, according to one embodiment. The THz sensor 200 includes a THz pulse generator 202 to generate terahertz pulses from an optical pulse system thereof and emit the generated terahertz pulses 21 toward a targeted material to be measured. In some embodiments, the optical pulse from the optical pulse system can be split to provide an optional probe pulse 203, which can strobe the THz pulse detector 204 when the detector 204 receives the terahertz pulses reflected from the targeted material. The detector 204 can detect the reflected terahertz pulses 23 and generate a test signal as a function of time. One exemplary THz sensor is commercially available from Luna Inc. (Roanoke, VA) under the trade designation of Terametrix T-Gauge TCU5220. It is to be understood that any suitable THz sensor or combinations thereof can be used other than the embodiments described herein.

Figure 2B:
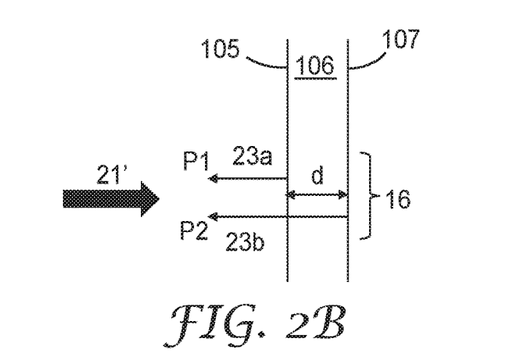
FIG. 2B is a schematic diagram of a portion of a film bubble being detected by a THz sensor, according to one embodiment.

FIG. 2B is a schematic diagram of a portion of a film bubble 106 being detected by a THz sensor, according to one embodiment. A terahertz beam 21' is directed toward the film bubble 106. A typical terahertz beam may have a terahertz frequency in the range, for example, from about 0.01 to about 10 THz. The terahertz beam 21' can readily propagate through various polymer material systems including, for example, continuous materials, multi-component materials, filled materials, foamed materials, etc.

The terahertz beam 21' can be focused to have a spot size covering a targeted area 16 of the film bubble 106 having a thickness d. The spot size of the terahertz beam 21' can be controlled to obtain an effective spatial resolution much higher compared to other types of sensors such as capacitive sensors and gamma backscatter sensors. In some embodiments, the spot size of the terahertz beam 21' can be controlled on the order of about 1 mm in diameter or about 1 $mm^2$ in area. In some embodiments, the spot size of the terahertz beam 21' can be in the range, for example, from about 0.001 $mm^2$ to about 1000 $mm^2$, from about 0.01 $mm^2$ to about 500 $mm^2$, from about 0.01 $mm^2$ to about 200 $mm^2$, or from about 0.01 $mm^2$ to about 100 $mm^2$. In some embodiments, the spot size of the terahertz beam 21' may be no greater than about 1000 $mm^2$, no greater than about 500 $mm^2$, no greater than about 200 $mm^2$, no greater than about 100 $mm^2$, or no greater than about 50 $mm^2$.

When the terahertz beam 21' is reflected by the outer surface 105 (an air/film interface) of the film bubble 106, a signal P1 can be generated by a THz sensor by detecting the reflected pulse 23a. See, for example, the positive peak P1 in FIG. 4C. When the terahertz beam 21' is reflected by the inner surface 107 (a film/air interface) of the film bubble 106, a signal P2 having an opposite sign of the signal P1 can be generated by a THz sensor by detecting the reflected pulse 23b. See, for example, the negative peak P2 in FIG. 4C. The reflected signals can be detected and processed to determine the thickness d of the targeted area 16 of the film bubble 106.

Referring again to FIG. 1A, the sensor 110 is located downstream of the die 102 and upstream of the nip rollers 108a and 108b to measure the thickness profile of the film bubble 106 over its circumference. It is to be understood that multiple sensors can be provided to measure the thickness profiles of the film bubble 106 and/or the film 106' at various locations. The measurements from the multiple sensors can be combined to provide information related to the properties of the film bubble 106.

In various embodiments, one or more THz sensors can be located at, for example, a) a location downstream of a blown film air ring and upstream of a frost line of the film bubble; b) a location adjacent to the frost line; c) a location downstream of the frost line and upstream of a lay-flat section which collapses the film bubble into a film; d) a location at or downstream of the lay-flat section, etc.

In some embodiments, at least one of the THz sensors can be located upstream of the lay-flat section (e.g., the nip rollers 108a-b), which can provide a shortened feedback time as compared to a location after the lay-flat section. In some embodiments, at least one of the THz sensors can be located downstream of the frost line, which can obtain data on the finished total film thickness when no further stretching of the film occurs downstream of the frost line.

In some embodiments, the system 100 can be provided with a control system for closed loop control of the width and thickness of the foil which is extruded from the die 102. In some embodiments, the sensor 110 can be combined with other types of sensors or measuring devices to measure the properties of the film bubble 106, or other operation parameters in a blown-film extrusion process. The properties or operation parameters may include, for example, a viscosity of the extruded material, an air pressure inside the film bubble, a temperature of cooling air blown against the film bubble, a temperature of the polymer melt in the die 102, etc.

It is to be understood that a film bubble may have various bubble geometries/properties associated with different process conditions. For example, U.S. Pat. No. 7,806,676 describes an air ring for controlling blown film thickness provided with individual heat conducting segments. In the present disclosure, the locations and configurations of the sensor 110 can be varied for suitable applications. In the depicted embodiments of FIGS. 3A-D, one or more THz sensors are provided at various locations, e.g., relative to the respective frost lines 7a, 7b, 7c and 7d, to measure the thickness profile of various film bubbles.

The bubble geometry differences as illustrated in FIGS. 3A-D may result from any number of combinations of, for example, different materials, extrusion rates, air flow condition, etc. Since a THz sensor uses a reflected signal, in some embodiments, the sensor can be located to face the bubble wall along the direction normal to the surface of the bubble and relatively stable such that the reflected THz signal is strong and relatively stable. The sensor can also be mounted in other locations adjacent to the bubble, and the geometry of the sensor can be adjusted in order to ensure that the reflected THz light returned to the THz receiver. In some embodiments, a separate optical sensing system can be used to determine the instantaneous direction of the normal to the bubble surface.

Figure 3A:
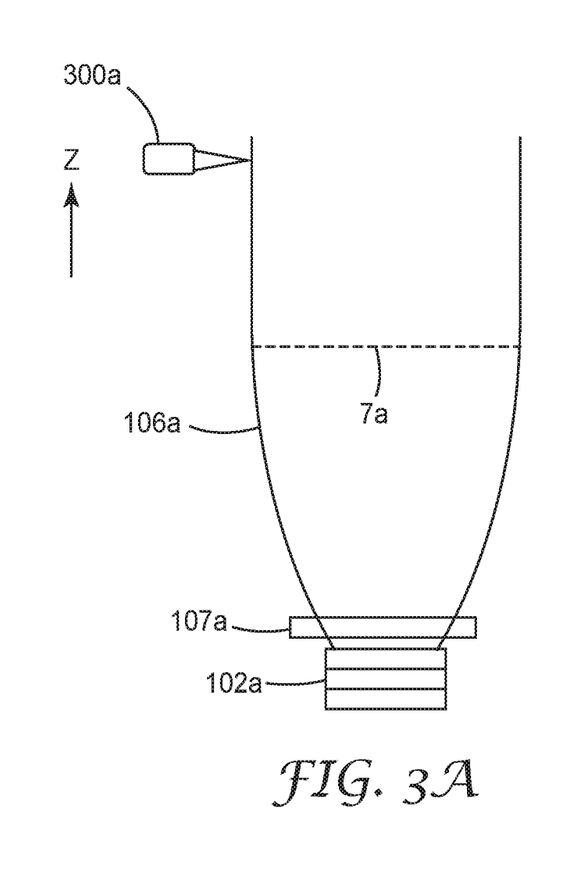
FIG. 3A is a schematic diagram of a portion of a blown film manufacturing line, according to one embodiment.

As shown in FIG. 3A, a THz transceiver 300a is provided downstream of the frost line 7a of a film bubble 106a. An air ring 107a is provided to adjust/control the geometry/property of the film bubble 106a. The THz transceiver 300a may include a beam source section to emit a THz beam which is focused at a localized area of the film bubble 106a. The THz beam then reflects off the localized area and returns to the transceiver 300a. The THz transceiver 300a includes a detection section to detect the reflected beam. The incident and reflected beams overlap in substantially the same space between the THz transceiver 300a and the localized area of the film bubble 106a. In some embodiments, a beam splitter can be provided inside the THz transceiver 300a to separate the beam source and beam detection sections.

Figure 3B:
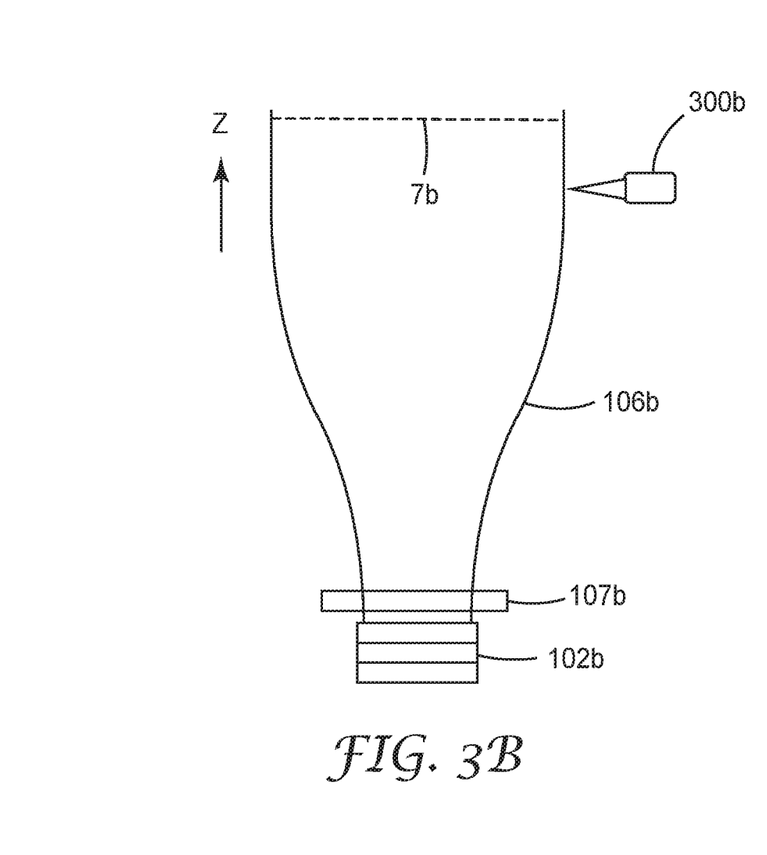
FIG. 3B is a schematic diagram of a portion of a blown film manufacturing line, according to another embodiment.

As shown in FIG. 3B, a THz transceiver 300b is provided adjacent to the frost line 7b of a film bubble 106b. An air ring 107b is provided to adjust/control the geometry/property of the film bubble 106b. The THz transceiver 300b may include a beam source section to emit a THz beam which is focused at a localized area of the film bubble 106b. The THz beam then reflects off the localized area and returns to the transceiver 300b. The THz transceiver 300b includes a detection section to detect the reflected beam. The incident and reflected beams overlap in substantially the same space between the THz transceiver 300b and the localized area of the film bubble 106b. In some embodiments, a beam splitter can be provided inside the THz transceiver 300b to separate the beam source and beam detection sections.

Figure 3C:
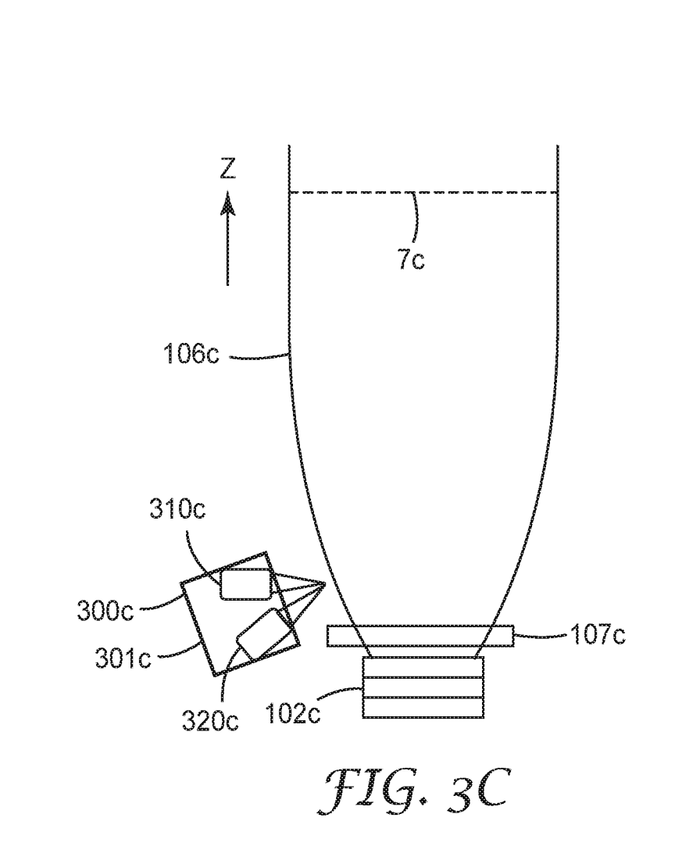
FIG. 3C is a schematic diagram of a portion of a blown film manufacturing line, according to another embodiment.
Figure 3D:
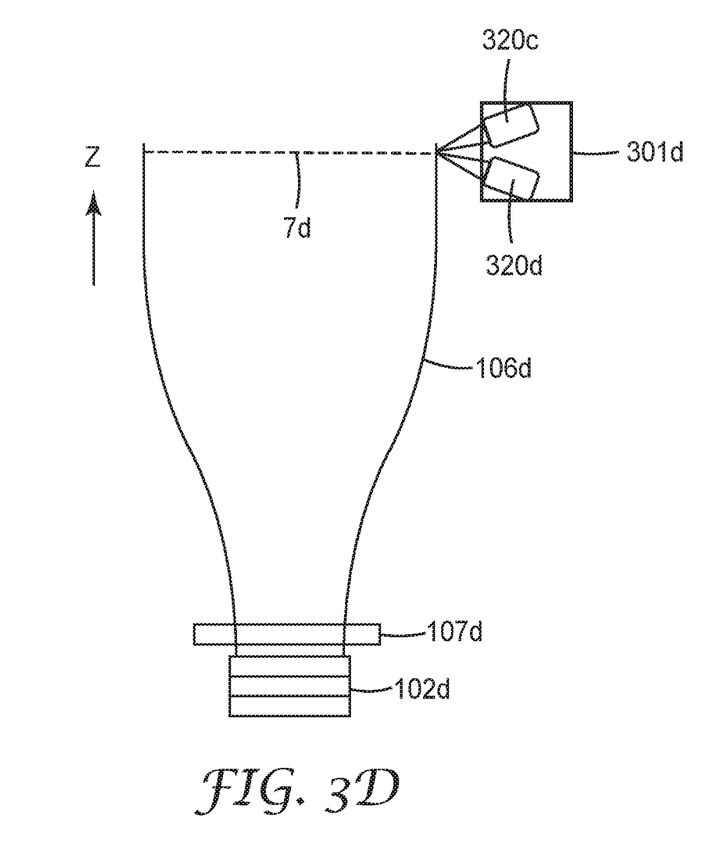
FIG. 3D is a schematic diagram of a portion of a blown film manufacturing line, according to another embodiment.

As shown in FIGS. 3C and 3D, the THz source and receiver units can be housed in separate modules, where no beam splitter is needed. The source and receiver units together are still referred to as the THz transceiver. As shown in FIG. 3C, a THz transceiver 300c is provided adjacent to a portion of a film bubble 106c closer to an air ring 107c as compared to that in FIGS. 3A-B. The air ring 107c is provided to adjust/control the geometry/property of the film bubble 106c. The THz transceiver 300c includes a beam source section 310c to emit a THz beam which is focused at a localized area of the film bubble 106c. The THz beam then reflects off the localized area and returns to a detection section 320c of the THz transceiver 300c. The light paths of incident and reflected beams may not substantially overlap in substantially the same space between the THz transceiver 300c and the localized area of the film bubble 106c. In many embodiments, the beam source section 310c and the detection section 320c are contained within a mechanical housing 301c to maintain mechanical integrity and optical alignments.

As shown in FIG. 3D, a THz transceiver 300d is provided adjacent to a central portion of a film bubble 106d. An air ring 107d is provided to adjust/control the geometry/property of the film bubble 106d. The THz transceiver 300d includes a beam source section 310d to emit a THz beam which is focused at a localized area of the film bubble 106d. The THz beam then reflects off the localized area and returns to a detection section 320d of the THz transceiver 300d. The light paths of incident and reflected beams may not substantially overlap in substantially the same space between the THz transceiver 300d and the localized area of the film bubble 106d. In many embodiments, the beam source section 310d and the detection section 320d are contained within a mechanical housing 301d to maintain mechanical integrity and optical alignments.

Figure 4A:
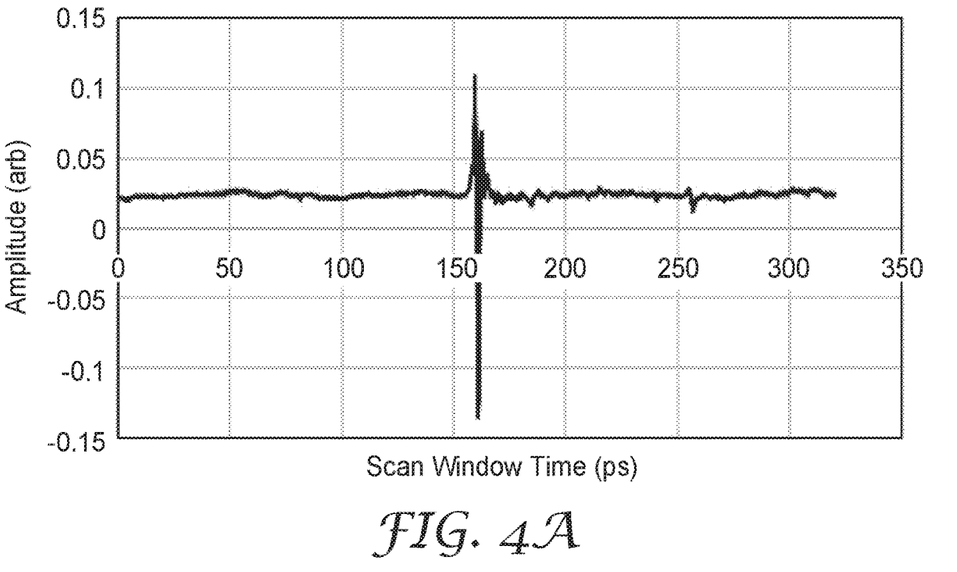
FIG. 4A illustrates a THz sensor signal by detecting a film bubble, according to one embodiment.
Figure 4B:
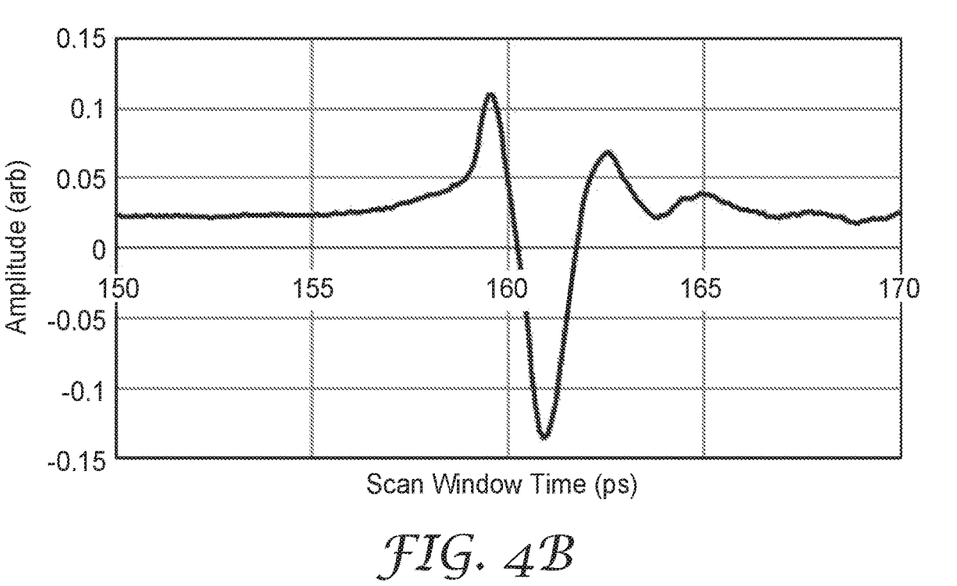
FIG. 4B is an enlarged portion view of the THz sensor signal of FIG. 4A.
Figure 4C:
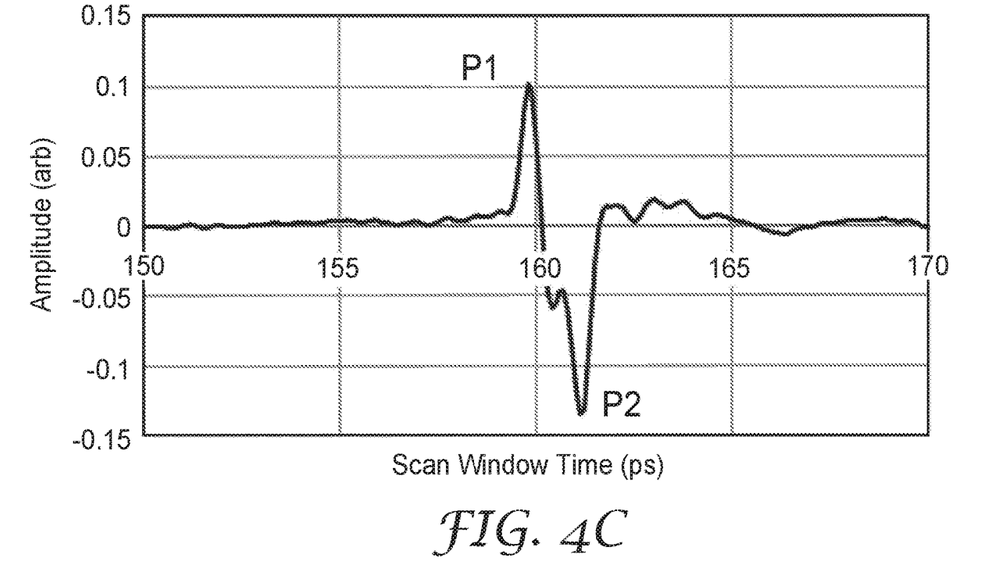
FIG. 4C is a deconvolved waveform of the THz sensor signal of FIG. 4B.

A THz sensor described herein can create waveforms that are analogous to many distance-and-ranging sensing modalities such as, for example, radar, lidar, ultrasound, etc. FIG. 4A illustrates a typical raw signal waveform acquired from a THz sensor by detecting a film bubble (e.g., the film bubble 106 of FIG. 1A). FIG. 4B illustrates a magnified view of the portion of signal corresponding to the reflections from the film bubble. This signal is first run through a bandpass filter to remove the DC offset and clean up some residual noise, and then deconvolved with the instrument response function associated with the THz sensor. The resulting deconvolved signal is shown in FIG. 4C. It is to be understood that any suitable means of signal processing known in the art can used to process data from a THz sensor.

The positive peak P1 of the signal corresponds to the time when a portion of the THz beam reflects from the air/measured material interface for which the beam travels from a medium (air) having a lower refractive index to another medium (measured material) having a higher refract index. The negative peak P2 corresponds to the time when a portion of the THz beam reflects from the film bubble/air interface for which the beam travels from a medium (measured material) having a higher refract index to another medium (air) having a lower refractive index. In other words, the positive peak P1 arises from the outer or front surface of the film bubble facing to the THz sensor; while the negative peak P2 arises from the inner or rear surface of the film bubble facing away from the THz sensor. The time window of the waveform may not be sufficient to pick up any reflections of the THz beam that might occur from the other side of the film bubble. The times associated with the positive and negative peaks P1 and P2 can be obtained by a peak finding algorithm. The elapsed time between the peaks P1 and P2 represents the round-trip propagation time of the THz pulse through the material of the film bubble. See also, FIG. 2B. The details of the waveform and the signs of the peaks used here to determine the round-trip propagation time are not meant to be limiting, as other signal processing methods could result in waveforms with different shapes. This round-trip propagation time, t, is related to the film thickness d, and the effective refractive index n of the film material according to the equation (1):

$$t = 2nd/c \qquad (1)$$

where c is the speed of light in vacuum. The effective refractive index n is used because the THz beam may include a broad range of frequencies, for example, from about 0.01 to about 10 THz, and/or the measured material may include a mixture of materials or multiple layers of materials. The effective refractive index n can be calibrated by, for example, taking a sample of the film material and measuring (i) the round-trip propagation time through that sample with a similar (or the same) THz sensor and (ii) the physical thickness d of the sample with another device such as, for example, a caliper gauge.

Figure 5A:
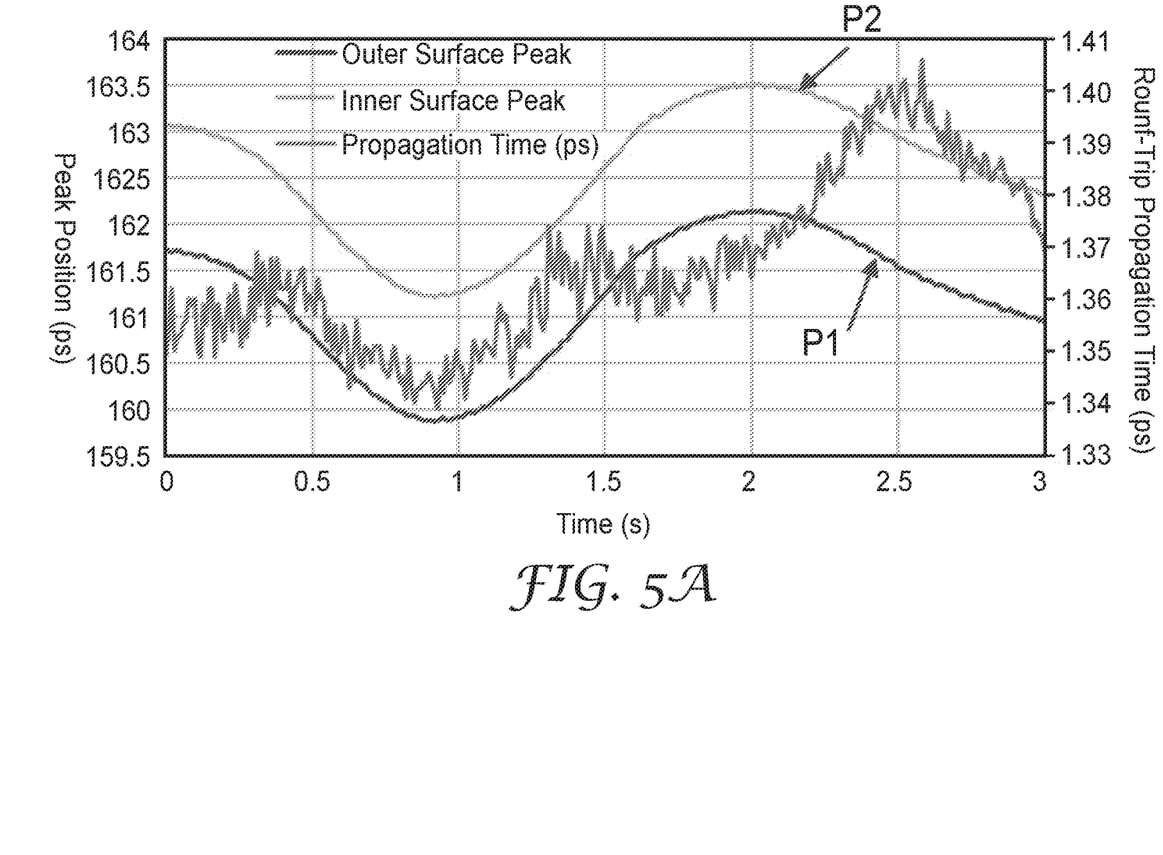
FIG. 5A illustrates peak-time profiles of a THz sensor by detecting a blown film, according to one embodiment.
Figure 5B:
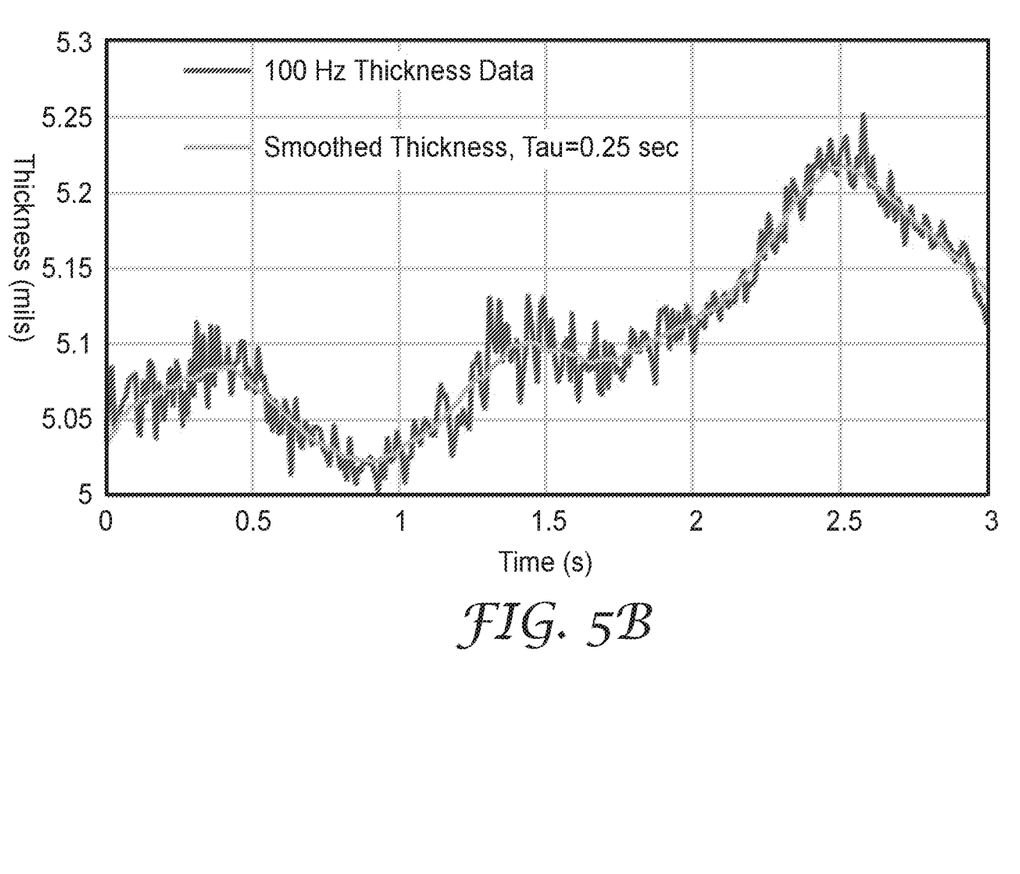
FIG. 5B illustrates a film thickness profile corresponding to the peak-time profiles of FIG. 5A.

FIG. 5A illustrates peak-time profiles for P1 and P2, and the corresponding round-trip propagation time t through the film bubble. FIG. 5B illustrates a film thickness profile corresponding to the peak-time profiles of FIG. 5A, calculated by using Equation (1) above. When the THz sensor scans around the film bubble, it gathers a circumferential thickness profile. In some embodiments, the thickness profile data can be used by a blown-film control system to flatten the thickness profile of the film bubble, by considering that the refractive index n may act as a proportional gain factor on the thickness d of the film bubble. This can be done even when the refractive index n is not calibrated to yield accurate thickness values. In some embodiments, the peak time for P1 and/or P2 can be used to control the distance from the THz sensor to the bubble, such that the sensor is always located at the optimal focal distance from the bubble. In some embodiments, the peak time for P1 and/or P2 can be used to control the internal pressure inside the bubble, or provide feedback to the air flow.

In some embodiments, a control system for a blown-film manufacturing system (e.g., the system 100 of FIG. 1A) can separate a process of flattening the thickness profile from the setpoint for film thickness. For example, in some embodiments, a film thickness can be measured for the doubled film 106' at a location at or downstream of the nip rolls 108a-b. The data from the doubled film 106' can be compared to the data from the sensor 112. Such a comparison can be used to determine a bias error caused by the value used for the effective refractive index n and/or other offsets between the two sets of data related to thickness measurement.

In some embodiments, the data from the sensor 112 can be used to control the film bubble thickness. For example, the measured film thickness profiles can be used to adjust extruder rates, adjust film haul-off speeds, etc. Since the data are measured upstream of the lay-flat section (e.g., nip rolls), this can provide a much shorter feedback lag than would be obtained from a sensor located downstream of the lay-flat section.

Various embodiments are provided that are sensing systems for online measurement of a blown film, and methods for online measurement of a blown film. One or more terahertz (THz) sensors are provided to measure a film bubble extruded from a blown film die. It is to be understood that the methods and sensing systems described herein can be used to measure the thickness or other physical properties of any suitable film materials, for example, to measure material thickness on a cast-film line, to measure conventional roll-to-roll films, foams, coatings, etc.

Various unexpected results and advantages are obtained in exemplary embodiments of the disclosure. One such advantage of exemplary embodiments of the present disclosure is that one or more terahertz (THz) sensors are used to measure a film bubble in a blown film line. The THz sensors can provide accurate thickness measurements with a high spatial resolution at a safe distance away from the film bubble.

The embodiments of the present disclosure provide a stand-off distance between the sensor and the film bubble that is maintained such that undesirable contacts between the film and the sensor caused by a motion of the film bubble due to a "breathing" mode or transport movement can be avoided. In contrast, conventional sensors may contact to the film bubble to cause defects or film break.

The embodiments of the present disclosure further provide sensors to access to the film bubble from an outer surface thereof to measure the film bubble before it is collapsed by a lay-flat section of the web line. In contrast, conventional sensors may need access to both sides of the film bubble, which in general may require the sensors be positioned after the film bubble is collapsed by the lay-flat section of the web line. The sensors of the embodiments of the present disclosure are positioned at a relative more upstream position to provide the thickness data, which can reduce the control lag time.

The embodiments of the present disclosure can be used for inline measurement of a wide variety of materials including, for example, optically transparent materials and optically opaque materials. In addition, the embodiments of the present disclosure can provide a high spatial resolution with high signal-to-noise levels, which can help to generate a prompt useful control signal without a significant amount of signal averaging.

The operation of the present disclosure will be further described with regard to the following embodiments. These embodiments are offered to further illustrate the various specific and preferred embodiments and techniques. It should be understood, however, that many variations and modifications may be made while remaining within the scope of the present disclosure.

Listing of Exemplary Embodiments

It is to be understood that any one of embodiments 1-10 and 11-16 can be combined.

Embodiment 1 is a sensing system for online measurement of a blown film comprising:
    a terahertz (THz) sensor positioned adjacent to a film bubble extruded from a blown film die; and
    a sensor support configured to guide the THz sensor around the circumference of the film bubble.

Embodiment 2 is the system of embodiment 1, wherein the THz sensor is positioned away from the film bubble with a standoff distance D in the range from about 25 to about 150 mm.

Embodiment 3 is the system of embodiment 1 or 2, wherein the THz sensor is configured to emit a THz signal toward a targeted area of the film bubble and receive a reflected signal from the targeted area.

Embodiment 4 is the system of embodiment 3 further comprising a processor to process the reflected signal to determine a thickness of the targeted area of the film bubble.

Embodiment 5 is the system of any one of embodiments 1-4, wherein the sensor support comprises an oscillating scanner track.

Embodiment 6 is the system of any one of embodiments 1-5, wherein the THz sensor comprises a THz transmitter and a THz detector.

Embodiment 7 is the system of any one of embodiments 1-6, wherein the THz sensor is located at a) a location downstream of a blown film air ring and upstream of a frost line of the film bubble; b) a location adjacent to the frost line; c) a location downstream of the frost line and upstream of a lay-flat section which collapses the film bubble into a film; or d) a location at or downstream of the lay-flat section.

Embodiment 8 is a blown film line comprising the sensing system of any one of embodiments 1-7, wherein the sensing system is configured to measure a thickness profile of the film bubble.

Embodiment 9 is the blown film line of embodiment 8 further comprising an outer cooling ring disposed adjacent to and downstream of the blown film die, wherein the THz sensor is located adjacent to and downstream of the outer cooling ring.

Embodiment 10 is the blown film line of embodiment 8 or 9 further comprising a lay-flat section to collapse the film bubble to a doubled film.

Embodiment 11 is a method for online measurement of a blown film comprising:
  providing a terahertz (THz) sensor positioned adjacent to a film bubble extruded from a blown film die;
  guiding, via a sensor support, the THz sensor around the circumference of the film bubble; and
  measuring, via the THz sensor, a film thickness profile of the film bubble.

Embodiment 12 is the method of embodiment 11, wherein the THz sensor is positioned away from the film bubble with a standoff distance D in the range from about 25 to about 150 mm.

Embodiment 13 is the method of embodiment 11 or 12, wherein the THz sensor is configured to emit a THz signal toward a targeted area of the film bubble and receive a reflected signal from the targeted area.

Embodiment 14 is the method of embodiment 13 further comprising processing the reflected signal to determine a thickness of the targeted area of the film bubble.

Embodiment 15 is the method of any one of embodiments 11-14 further comprising measuring the thickness of a doubled film which is formed by collapsing the film bubble.

Embodiment 16 is the method of embodiment 15 further comprising comparing the thickness of the doubled film with the film thickness profile of the film bubble.

Example(s)

These examples are merely for illustrative purposes and are not meant to be limiting on the scope of the appended claims.

A terahertz (THz) sensor (commercially available from Luna, Inc, Roanoke, VA, under the trade designation of Terametrix T-Gauge TCU5220 Controller 320/100) was mounted on a circular scanning frame (commercially available from Kundig Control Systems, Ruti, Switzerland, under the trade designation of Kundig K-NDC Rotomat KT 3G) on a blown film line (commercially available from Windmoeller and Hoelscher, Lengerich, Germany, under the trade designation of Windmoeller and Hoelscher Varex Blown Film Line) at a location beside an existing gamma backscatter (GBS) gauge, which was disabled during this test. The circular scanning frame has a diameter of about 300 cm. The THz sensor was positioned with a standoff distance of about 75 mm from the normal operating location of the film plane, placing the beam focus at the expected film plane. A film bubble was extruded from a blown film die of the blown film line. The polymer melt was LDPE (Low-Density Polyethelene, commercially available from Basell Orlen Polyolefins, Plock, Poland, under the trade designation of Malen "E FABS 23-D006"). The THz sensor was positioned about 600 cm from the blown film die. A measured thickness profile was shown in FIG. 5B.

What is claimed is:

1. A sensing system for online measurement of a blown film comprising:
  a terahertz (THz) sensor positioned adjacent to a film bubble extruded from a blown film die; and
  a sensor support configured to guide the THz sensor around the circumference of the film bubble, wherein the THz sensor is configured to:
  measure a thickness profile of the film bubble;
  measure a thickness of a doubled film which is formed by collapsing the film bubble; and
  compare the thickness of the doubled film with the film thickness profile of the film bubble.

2. The system of claim 1, wherein the THz sensor is positioned away from the film bubble with a standoff distance D in the range from about 25 mm to about 150 mm.

3. The system of claim 1, wherein the THz sensor is configured to emit a THz signal toward a targeted area of the film bubble and receive a reflected signal from the targeted area.

4. The system of claim 3 further comprising a processor to process the reflected signal to determine a thickness of the targeted area of the film bubble.

5. The system of claim 1, wherein the sensor support comprises an oscillating scanner track.

6. The system of claim 1, wherein the THz sensor comprises a THz transmitter and a THz detector.

7. The system of claim 1, wherein the THz sensor is located at a) a location downstream of a blown film air ring and upstream of a frost line of the film bubble; b) a location adjacent to the frost line; c) a location downstream of the frost line and upstream of a lay-flat section which collapses the film bubble into a film; or d) a location at or downstream of the lay-flat section.

8. The blown film line of claim 1, further comprising an outer cooling ring disposed adjacent to and downstream of the blown film die, wherein the THz sensor is located adjacent to and downstream of the outer cooling ring.

9. The blown film line of claim 1 further comprising a lay-flat section to collapse the film bubble to a doubled film.

10. A method of online measurement of a blown film comprising:
  providing a terahertz (THz) sensor positioned adjacent to a film bubble extruded from a blown film die;
  guiding, via a sensor support, the THz sensor around the circumference of the film bubble;
  measuring, via the THz sensor, a thickness profile of the film bubble;
  measuring, via the THz sensor, a thickness of a doubled film which is formed by collapsing the film bubble; and
  comparing the thickness of the doubled film with the film thickness profile of the film bubble.

11. The method of claim 10, wherein the THz sensor is positioned away from the film bubble with a standoff distance D in the range from about 25 mm to about 150 mm.

12. The method of claim 10, wherein the THz sensor is configured to emit a THz signal toward a targeted area of the film bubble and receive a reflected signal from the targeted area.

13. The method of claim 12 further comprising processing the reflected signal to determine a thickness of the targeted area of the film bubble.

* * * * *